(12) United States Patent
Chapman et al.

(10) Patent No.: US 12,078,111 B2
(45) Date of Patent: *Sep. 3, 2024

(54) SYSTEMS AND METHODS FOR DETERMINING AND/OR CONTROLLING MOTOR THRUST AND ENGINE THRUST IN A PARALLEL HYBRID AIRCRAFT

(71) Applicant: Ampaire, Inc., Hawthorne, CA (US)

(72) Inventors: Alex J. Chapman, Murrieta, CA (US); Peter J. Savagian, Murrieta, CA (US)

(73) Assignee: Ampaire, Inc., Hawthorne, CA (US)

( * ) Notice: Subject to any disclaimer, the term of this patent is extended or adjusted under 35 U.S.C. 154(b) by 63 days.

This patent is subject to a terminal disclaimer.

(21) Appl. No.: 17/856,902

(22) Filed: Jul. 1, 2022

(65) Prior Publication Data
US 2023/0099744 A1   Mar. 30, 2023

Related U.S. Application Data

(63) Continuation of application No. 17/005,248, filed on Aug. 27, 2020, now Pat. No. 11,378,016.

(51) Int. Cl.
*B64D 31/12*   (2006.01)
*B64D 27/24*   (2006.01)
(Continued)

(52) U.S. Cl.
CPC .............. *F02C 9/00* (2013.01); *B64D 27/24* (2013.01); *B64D 31/12* (2013.01); *B64D 27/026* (2024.01);
(Continued)

(58) Field of Classification Search
CPC .. B64D 31/12; B64D 27/24; B64D 2027/026; F02C 9/00; F05D 2270/051; F05D 2270/13; F05D 2260/81
See application file for complete search history.

(56) References Cited

U.S. PATENT DOCUMENTS

| 2012/0091257 A1 | 4/2012 | Wolff et al. |
| 2014/0223884 A1 | 8/2014 | Sankrithi et al. |

(Continued)

FOREIGN PATENT DOCUMENTS

WO   2022/046567 A1   3/2022

OTHER PUBLICATIONS

International Search Report and Written Opinion in International Application No. PCT/US2021/046989, mailed on Dec. 8, 2021.
(Continued)

*Primary Examiner* — Tye William Abell

(57) ABSTRACT

A system for determining and/or controlling motor thrust and engine thrust in a parallel hybrid aircraft. One or more sensors may be configured to monitor one or more flight parameters to generate sensor information. User input including one or more pilot estimates may be received. The sensor information may be obtained. A performance thrust ratio may be calculated based on the user input, the sensor information, an aerodynamic model, a propeller model, and a battery model. The performance thrust ratio may be used to control the motor thrust and engine thrust to improve utilization of electric energy throughout a flight. A first thrust setting for the motor and/or a second thrust setting for the engine may be determined based on the performance thrust ratio.

20 Claims, 5 Drawing Sheets

(51) Int. Cl.
  *F02C 9/00*  (2006.01)
  *B64D 27/02*  (2006.01)
(52) U.S. Cl.
  CPC .... *F05D 2260/81* (2013.01); *F05D 2270/051* (2013.01); *F05D 2270/13* (2013.01)

(56) References Cited

U.S. PATENT DOCUMENTS

| | | | |
|---|---|---|---|
| 2016/0376003 A1 | 12/2016 | Feldman | |
| 2017/0370790 A1* | 12/2017 | Hettler | F01D 21/003 |
| 2019/0002115 A1* | 1/2019 | Miller | B64D 31/06 |
| 2019/0291862 A1 | 9/2019 | Lyasoff et al. | |
| 2020/0017228 A1 | 1/2020 | Combs et al. | |
| 2021/0025339 A1* | 1/2021 | Terwilliger | B64D 27/02 |
| 2021/0222629 A1* | 7/2021 | Terwilliger | B64D 27/24 |
| 2021/0403168 A1* | 12/2021 | Parsons | B64D 27/02 |

OTHER PUBLICATIONS

International Search Report and Written Opinion for Application No. PCT/US2021/046989, mailed on Mar. 9, 2023, 10 pages.

\* cited by examiner

SYSTEMS AND METHODS FOR DETERMINING AND/OR CONTROLLING MOTOR THRUST AND ENGINE THRUST IN A PARALLEL HYBRID AIRCRAFT

FIELD

The disclosure relates to systems and methods for determining and controlling electric motor thrust and combustion engine thrust in a parallel hybrid aircraft.

BACKGROUND

A parallel-hybrid aircraft comprising a combination of one or more electric motor-driven propellers and/or internal combustion engine propulsors (e.g., propellers, turbofans, etc.), presents an opportunity to vary the ratio of thrust contribution from each propeller and/or propulsor by varying the thrust provided by individual ones of the one or more motors and/or engines. While the total propulsion capability is sized for take-off and initial climb requirements, the cruise-climb, cruise and landing segments of a flight require some fraction of said capability.

The cost of every flight is a function of the fuel and battery charge consumed. In the typical case, fuel costs much more on an energy/thrust basis than electricity. However, liquid fuel contains much more energy/thrust potential on a mass basis. Thus, with a limited battery capacity onboard, the most cost-effective flight is the one that uses the entire battery capacity over the course of the flight, save for some energy required by regulations as "reserves," or the energy expected to be used to extend flight in the event of an unexpected delay to landing. The energy capacity of a battery is a function of its chemistry, size, configuration, demand over a discharge cycle and history of usage. This complexity makes optimized utilization difficult in real time.

SUMMARY

One aspect of the disclosure relates to a system and/or method for determining and/or controlling motor thrust and engine thrust in a parallel hybrid aircraft. The parallel hybrid aircraft may include a multiple propeller aircraft having one or more motors (e.g., powering one or more electric motor-driven propellers) and/or engines (e.g., powering one or more internal combustion engine propulsors, such as propellers). In some embodiments, the motor thrust may correspond to the thrust provided via the one or more motors (e.g., by way of one or more propellers and/or other thrust mechanisms), and/or the engine thrust may correspond to the thrust provided via the one or more engines (e.g., by way of one or more propellers, propulsors, and/or other thrust mechanisms). Other electric propulsion systems and/or combustion propulsion systems are contemplated.

In some embodiments, the motor thrust may correspond to the thrust provided by an electric propulsion system and/or individual portions of the electric propulsion system, and/or the engine thrust may correspond to the thrust provided by the combustion propulsion system and/or individual portions of the combustion propulsion system. The electric propulsion system may include one or more propellers, driven by one or more motors, controlled by one or more motor controllers (i.e., inverters), powered by one or more battery systems, and/or other components. The combustion propulsion system may include an engine (e.g., a combustion engine and/or other engine), one or more propulsors and/or propellers powered by the engine, and/or other components. In some implementations, the combustion propulsion system and/or the electric propulsion system may include one or more of a compressor, diesel engine, a piston engine, a ducted fan, a turbine, a combustor, a mixer, a propeller, a nozzle, and/or other components.

As described herein, the system may be configured to determine and/or control the motor thrust and the engine thrust in a parallel hybrid aircraft via calculation of a performance thrust ratio. The performance thrust ratio may represent and/or indicate an optimal and/or beneficial ratio of thrust contribution from each of the motor and/or engine pair(s). This may enable the parallel hybrid aircraft to have a more efficient and/or cost-effective operation by effectively balancing the fuel and battery charge consumed during a flight of the parallel hybrid aircraft.

The parallel hybrid aircraft may include one or more of: a passenger aircraft (e.g., a 4-5 passenger aircraft, a two-passenger aircraft, a business aircraft, a commercial aircraft, etc.), an unpiloted cargo aircraft, a piloted cargo aircraft, an unmanned aircraft (e.g., an unmanned aerial vehicle, etc.), and/or other aircraft. The parallel hybrid aircraft may comprise a fuselage, an electric propulsion system (e.g., one or more motors), a combustion propulsion system (e.g., one or more engines), a flight control system, one or more actuators (e.g., a linear actuator), and/or other components.

A system for determining and/or controlling motor thrust and engine thrust in a parallel hybrid aircraft may include one or more sensors. The one or more sensors may be configured to monitor one or more flight parameters. The sensors may generate sensor information by monitoring the one or more flight parameters. The sensors may monitor the state-of-charge for the one or more batteries, an actual altitude of the aircraft, an actual speed of the aircraft (e.g., a current speed), a throttle command (e.g., a throttle command input but the pilot). In some implementations, the one or more sensors may monitor one or more flight parameters on a continuous or semi-continuous basis during a flight.

In some implementations, the system may comprise one or more physical processors configured to execute machine-readable instructions. The machine-readable instructions may include one or more of a sensor information component, a user input component, a performance thrust ratio component, a thrust setting component, an actuator component, a propeller speed component, and/or other components.

The user input component may be configured to receive user input. The user input may include one or more pilot estimates. The pilot estimates may include one or more of an intended flight distance, an intended cruise speed, an intended cruise altitude, an aircraft weight (e.g., mass), one or more flight conditions, and/or other information. The pilot estimates may be input by the pilot prior to and/or during a given flight.

The sensor information component may be configured to obtain the sensor information generated by the one or more sensors. The sensor information may be obtained from the one or more sensors. The sensor information may be obtained on a continuous and/or semi-continuous basis. The sensor information may monitor multiple aspects of the current flight such as the state-of-charge for the one or more batteries, an actual altitude of the aircraft, an actual speed of the aircraft (e.g., a current speed), a throttle command (e.g., a throttle command input but the pilot), and/or one or more other aspects of the current flight.

The performance thrust ratio component may be configured to calculate a performance thrust ratio. In some implementations, the performance thrust ratio may represent an optimal and/or beneficial ratio of thrust contribution from each of the one or more motor driven propellers and/or the one or more engine driven propellers. The performance thrust ratio may be calculated based on the user input, the sensor information, an aerodynamic model, a propeller model, a battery model, and/or other information. The performance thrust ratio may be calculated multiple times during a given flight (e.g., periodically, at set intervals, at set points during a flight, continuously, and/or semi-continuously). In some implementations, the performance thrust ratio may be used to control and/or adjust the motor thrust and engine thrust to improve utilization of electric energy throughout a flight.

The aerodynamic model may comprise test data and/or equations modeling flight drag. The propeller model may comprise test data and/or equations indicating the propeller efficiency for individual ones of one or more propellers on the parallel hybrid aircraft. The battery model may comprise test data and/or equations modeling the energy capacity of a battery. The energy capacity of the battery may be a function of its chemistry, size, configuration, demand over a discharge cycle, history of usage, and/or other information.

In some implementations, the parallel hybrid aircraft may comprise multiple motors and/or engines (e.g., multiple electric motor-driven propellers and/or combustion engine-driven propulsors). The combustion engine-driven propulsors may comprise one or more propellers, turbofans, and/or other propulsors). The combustion engine-driven propulsors and/or multiple electric motor-driven propellers may be independently operable and/or controlled by multiple performance thrust ratios calculated by the performance thrust ratio component. The multiple performance thrust ratios may be calculated based on the user input, the sensor information, the aerodynamic model, the propeller model for a corresponding propeller, the battery model, and/or other information. Individual ones of the multiple performance thrust ratios may be used to control and/or adjust the motor thrust and/or the engine thrust for individual pairs of the motor/engines.

In some implementations, thrust setting component may be configured to determine a first thrust setting for the motor and/or a second thrust setting for the engine. The first and/or second thrust settings may be determined based on the performance thrust ratio. In some implementations, the first thrust setting may be determined based on the performance thrust ratio and/or a pilot throttle input. In some implementations, multiple thrust settings for individual ones of the internal combustion engine-driven propulsors and/or multiple electric motor-driven propellers may be determined based on the multiple performance thrust ratios.

In some implementations, actuator component may be configured to control the motor power level of the parallel hybrid aircraft according to the first thrust setting and/or the engine power level according to the second thrust setting. The motor and/or engine power level setting may be actuated via a linear actuator and/or other type of actuator and/or digital interface.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise. As used in the specification and in the claims, the distinctions "first", "second", and/or "third" are used for clarity and distinction purposes and do not indicate order unless the context clearly dictates otherwise.

DETAILED DESCRIPTION

Figure 1A:
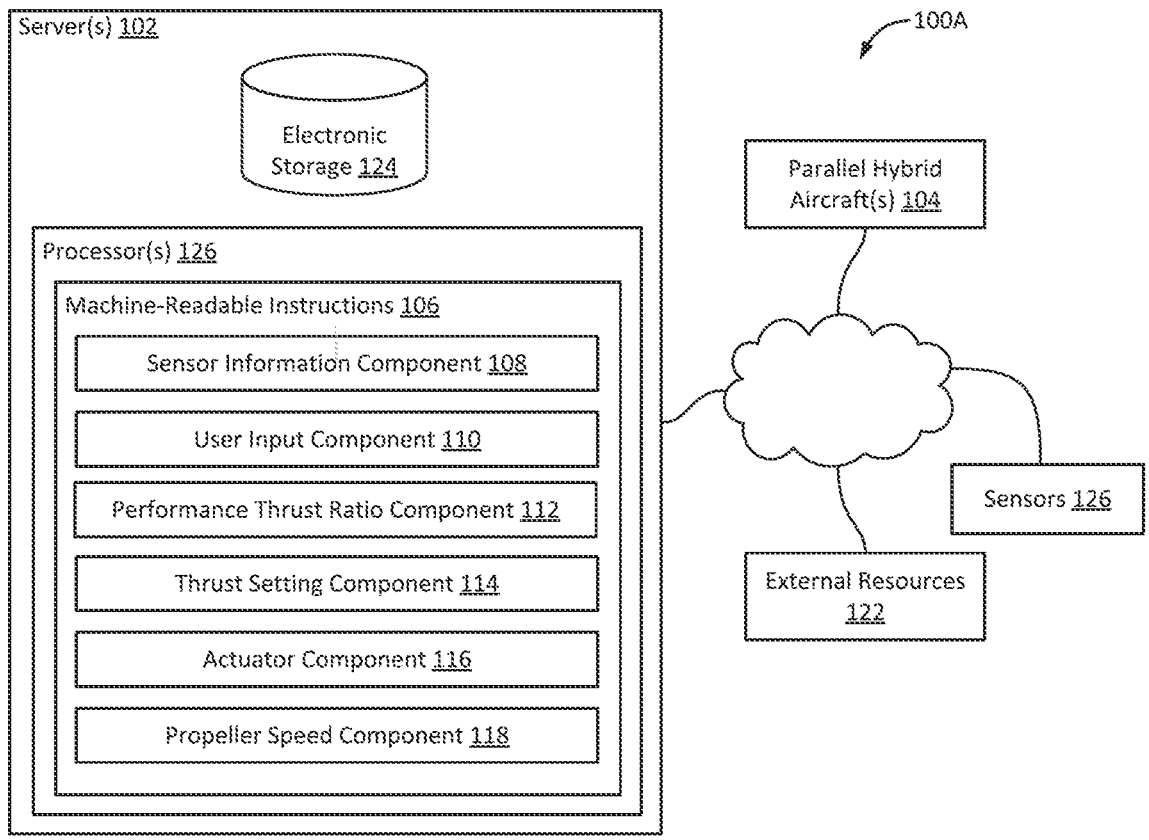
FIGS. 1A and 1B illustrates a system for determining and/or controlling motor thrust and engine thrust in a parallel hybrid aircraft, in accordance with one or more implementations.
Figure 1B:
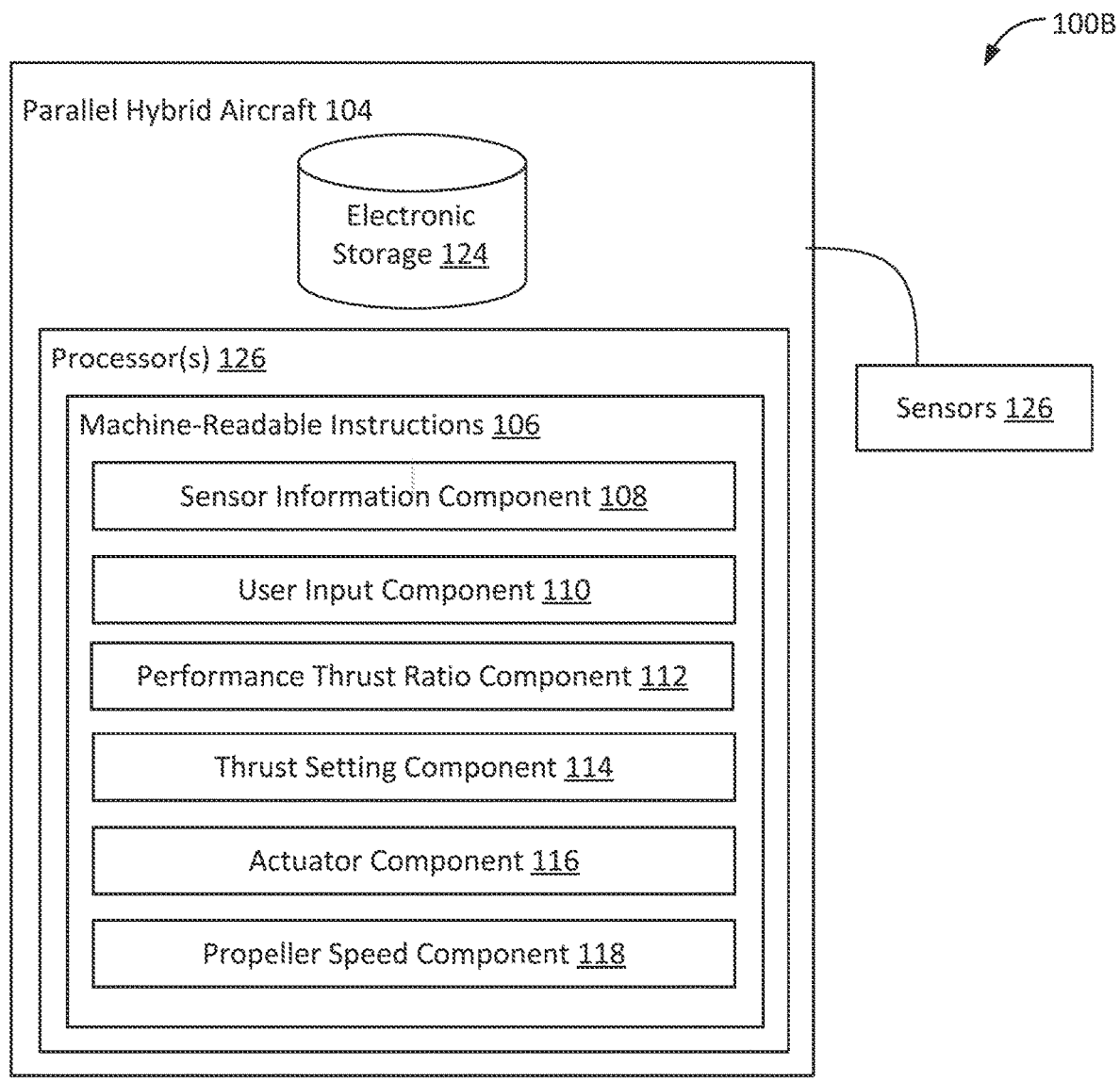

FIGS. 1A and 1B illustrate a system for determining and/or controlling motor thrust and engine thrust in a parallel hybrid aircraft, in accordance with one or more implementations. System 100 may be used to minimize and/or decrease fuel usage, and/or maximize and/or increase electric power usage during a flight of a parallel-hybrid aircraft. A user may input one or more pilot estimates characterizing a flight and/or the parallel hybrid aircraft. Sensors may monitor one or more flight parameters including a battery state of charge, actual altitude, actual speed, throttle command, and/or other flight parameters. An aerodynamic model, propeller model, and/or battery model may be used along with the pilot estimates and/or sensor information to calculate a performance thrust ratio. The performance thrust ratio may indicate an appropriate and/or optimal thrust setting for individual ones of the one or more motors and/or one or more engines. A thrust setting for the motor and/or a thrust setting for the engine may be determined based on the performance thrust ratio. The thrust settings may improve and/or optimize fuel usage and/or electric power usage for a given aircraft for a given flight.

In FIG. 1A, according to one implementation, system 100A may include one or more servers 102. Server(s) 102 may be configured to communicate with one or more parallel hybrid aircraft(s) 104 according to a client/server architecture and/or other architectures. Parallel hybrid aircraft(s) 104 may be configured to communicate with other client computing platforms via server(s) 102 and/or according to a peer-to-peer architecture and/or other architectures. Users and/or pilots may access system 100 via parallel hybrid aircraft(s) 104.

Server(s) 102 may include processor(s) 126 and/or electronic storage 124. Processor(s) 126 may be configured by machine-readable instructions 106. Machine-readable instructions 106 may include one or more instruction components. The instruction components may include computer program components. The instruction components may include one or more of a sensor information component 108, a user input component 110, a performance thrust ratio component 112, a thrust setting component 114, an actuator component 116, and/or other instruction components.

Sensors 126 may be configured to communicate with server(s) 102 to provide sensor information characterizing the flight and/or aircraft status. Sensors 126 may monitor one or more aspects of the flight, aircraft, fuel and/or batteries as flight parameters. Sensors 126 may monitor the flight parameters on a continuous and/or semi-continuous basis. In some implementations, sensors 126 may be configured to monitor the flight parameters periodically throughout a given flight.

In FIG. 1B, according to one implementation, system 100B may comprise an onboard computing system with processor(s) 126 and/or electronic storage 124. Processor(s) 126 may be configured by machine-readable instructions 106. Machine-readable instructions 106 may include one or more instruction components. The instruction components may include computer program components. The instruction components may include one or more of a sensor information component 108, a user input component 110, a performance thrust ratio component 112, a thrust setting component 114, an actuator component 116, and/or other instruction components.

System 100B may include sensors 126. Sensors 126 may be configured to monitor and/or provide sensor information characterizing the flight and/or aircraft status. Sensors 126 may monitor one or more flight parameters indicating one or more aspects of the flight, aircraft, fuel, and/or batteries. Sensors 126 may monitor the flight parameters on a continuous and/or semi-continuous basis. In some implementations, sensors 126 may be configured to monitor the flight parameters periodically throughout a given flight.

User input component 110 may be configured to receive user input. The user input may be provided by a pilot and/or other user prior to and/or during a given flight. The one or more pilot estimates provided by the pilot may be used by system 100 as part of the basis for determining the performance thrust ratio. The pilot estimates may characterize the flight and/or an aircraft for a given flight. By way of example, the pilot estimates may include one or more of an intended flight distance, an intended cruise speed, an intended cruise altitude, an intended cruise range, an aircraft weight (e.g., mass), one or more flight conditions, and/or other information.

Sensor information component 108 may be configured to obtain the sensor information. The sensor information may be obtained from the one or more sensors. The sensor information may be monitored and/or obtained on a continuous and/or semi-continuous basis. The sensor information may monitor multiple aspects of the current flight such as the state-of-charge for the one or more batteries, an actual altitude of the aircraft, an actual speed of the aircraft (e.g., a current speed), a throttle command (e.g., a throttle command input but the pilot), and/or one or more other aspects of the current flight.

Performance thrust ratio component 112 may be configured to calculate a performance thrust ratio. The performance thrust ratio may indicate an optimal and/or beneficial ratio of thrust that should be provided by the motor and/or the engine. In some embodiments, the performance thrust ratio may represent the thrust for each of the one or more motor driven propellers and/or each of the one or more engine driven propellers. The performance thrust ratio may be calculated based on multiple models characterizing the aerodynamics of a given aircraft, the propellers, and/or the batteries. Performance thrust ratio component 112 may be configured to calculate the performance thrust ratio based on a user input, the sensor information, an aerodynamic model, a propeller model, a battery model, and/or other information. In some implementations, the performance thrust ratio may represent the optimal and/or an improved utilization of electric energy compared to fuel consumption throughout a flight.

In some implementations, the output of system 100 may be the performance thrust ratio calculated by performance thrust ratio component 112. In other implementations, the performance thrust ratio may be used to determine one or more thrust settings and/or actuate the motor and/or the engine according to the determined thrust settings. The motor and/or engine may be actuated via one or more linear actuators, electronic interfaces, and/or other systems. The performance thrust ratio may be calculated multiple times during a given flight (e.g., periodically, at set intervals, at set points during a flight, continuously, and/or semi-continuously). In some implementations, the performance thrust ratio may be used to control and/or adjust the motor thrust and engine thrust to improve utilization of electric energy and/or fuel throughout a flight.

The aerodynamic model may comprise test data and/or equations modeling flight drag, and/or other information. The propeller model may comprise test data and/or equations indicating the propeller efficiency for individual ones of one or more propellers on the parallel hybrid aircraft, and/or other information. The battery model may comprise test data and/or equations modeling the energy capacity of a battery, the delivery an energy over the life and/or other information. Individual batteries may have corresponding battery models. The energy capacity of the battery may be a function of its chemistry, size, configuration, battery energy delivery over the course of its capacity, history of usage, and/or other information.

In some implementations, the parallel hybrid aircraft may comprise multiple combustion engine-driven propulsors and/or multiple electric motor-driven propellers. The combustion engine-driven propulsors and/or multiple electric motor-driven propellers may be independently operable and/or controlled by multiple performance thrust ratios calculated by the performance thrust ratio component. The multiple performance thrust ratios may be calculated based on the user input, the sensor information, the aerodynamic model, the propeller model for a corresponding propeller, the battery model, and/or other information.

Figure 2:
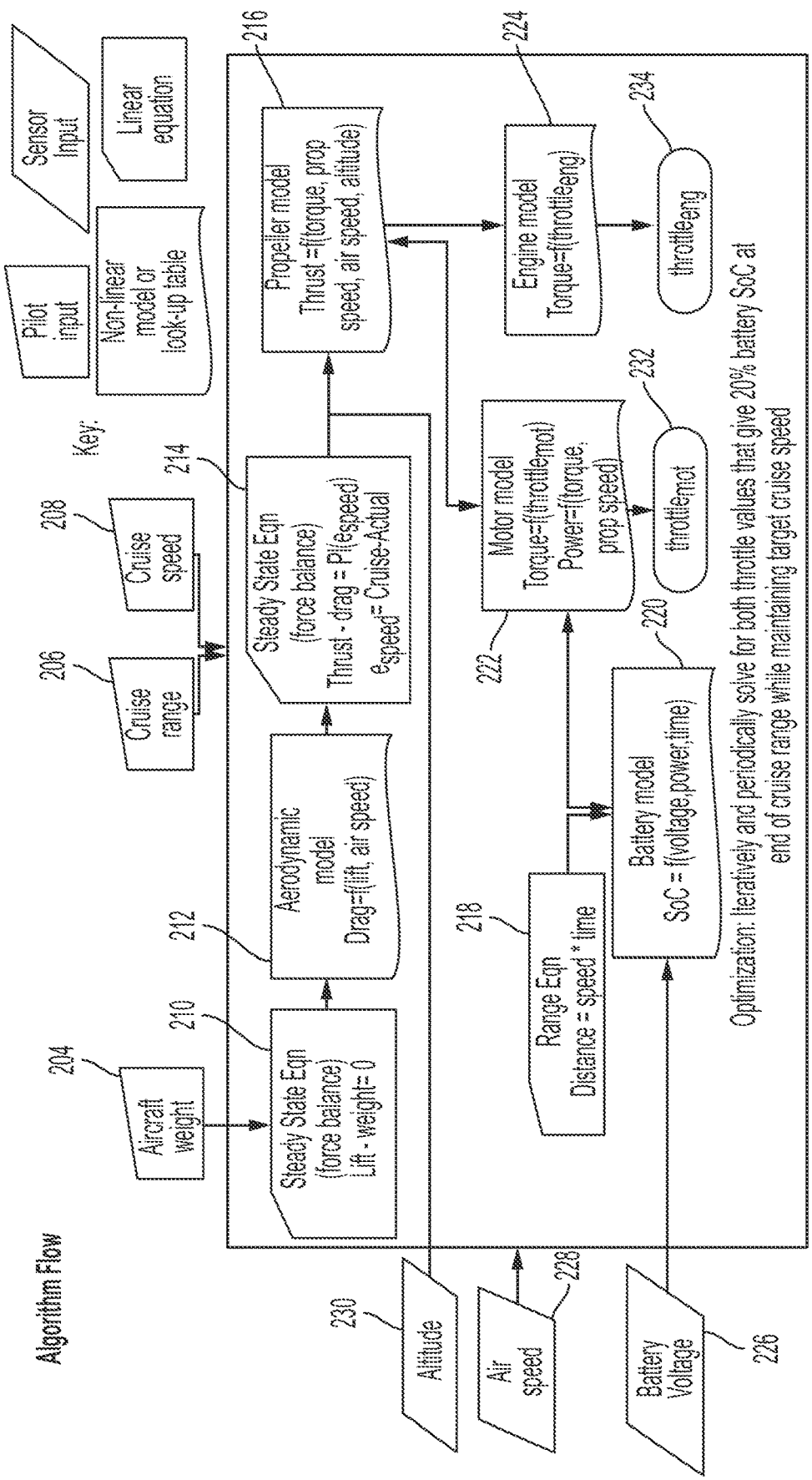
FIG. 2 illustrates a flow chart of the determination of performance thrust ratio for a parallel hybrid aircraft, in accordance with one or more implementations.

FIG. 2 illustrates a flow chart of the determination of the performance thrust ratio for a parallel hybrid aircraft, in accordance with one or more implementations. The determination of the performance thrust ratio illustrated in FIG. 2 may be performed by a performance thrust ratio component (the same as or similar to performance thrust ratio component 112). The performance thrust ratio may be determined utilizing user input by the pilot and sensor information as inputs. The user input may comprise the aircraft weight 204, the cruise range 206 (i.e., estimated flight distance), and/or the cruise speed 208 (i.e., estimated flight speed). The sensor information may comprise the altitude 230 (i.e., actual altitude), the air speed 228, battery voltage 226, depth-of-discharge 227 (e.g., a count of energy that has come out of the battery pack such as a value that may be provided by a sensor and/or battery management system), state of charge (e.g., a percentage of total energy), and/or other sensor information. The performance thrust ratio may be determined based on multiple equations and/or models. Steady state equation 210 may utilize the input to calculate the force balance to be used in aerodynamic model 212. The output from aerodynamic model 212 may be used in another steady state equation 214 to calculate the force balance. The output from steady state equation 214 may be input in propeller model 216. The output from propeller model 216 may be input into motor model 222 and engine model 224. Range equation 218 may be input into battery model 220. Battery model 220 may also be input into motor model 222. Motor model 222 may utilize the inputs to determine a motor throttle 232 as output and/or engine model 224 may utilize the inputs to determine an engine throttle 234 as output.

By way of non-limiting example, the performance thrust ratio may be determined for individual motor-engine pairs during climb, cruise, and/or descent phases of a flight. The flow chart illustrated in FIG. 2 may be used to compute the optimal and/or improved ratio of thrust request from a given motor-engine pair. The optimization and/or improvement may increase and/or maximize the usage of the electric energy capacity over the course of the flight (e.g. finishing the flight with only enough battery energy left for required reserves) given the intended flight range, cruise speed, altitude, estimated mass, and/or the current state of charge.

Returning to FIGS. 1A and 1B, in some implementations, thrust setting component 114 may be configured to determine a first thrust setting for the motor and/or a second thrust setting for the engine. The first thrust setting, the second thrust setting, and/or other thrust settings determined by thrust setting component 114 may, in some implementations, be the output of system 100. The first and/or second thrust settings may be determined for a given motor-engine pair. The thrust settings may be determined based on the performance thrust ratio. In some implementations, the thrust settings may be determined based on the performance thrust ratio, a pilot throttle input, and/or other information. In some implementations, multiple thrust settings for individual ones of the internal combustion engine-driven propulsors and/or multiple electric motor-driven propellers, and/or pairs of the combustion engine-driven propulsors and the electric motor-drive propellers may be determined based on the multiple performance thrust ratios.

In some implementations, actuator component 116 may be configured to actuate the motor of the parallel hybrid aircraft according to the first thrust setting and/or the engine according to the second thrust setting. The motor and/or engine may be actuated via a linear actuator, electronic interfaces, and/or other systems and/or actuators. In some implementations, the output of system 100 may be actuation of the motor and/or the engine according to the first thrust setting and/or the second thrust setting. The output of system 100 may be determined on a continuous and/or semi continuous basis. By way of non-limiting example, the output of system 100 may be determined each minute of a given flight and/or more or less frequently.

In some implementations, the output of system 100 may comprise a vehicle speed-control loop output. The vehicle speed-control loop output may comprise a semi-continuous feedback control loop. The speed-control loop output may be used along with a ratio between motor and engine (e.g., a previously determined performance thrust ratio and/or other ratio) to determine how much thrust the motor and/or engine each need to produce.

Figure 3A:
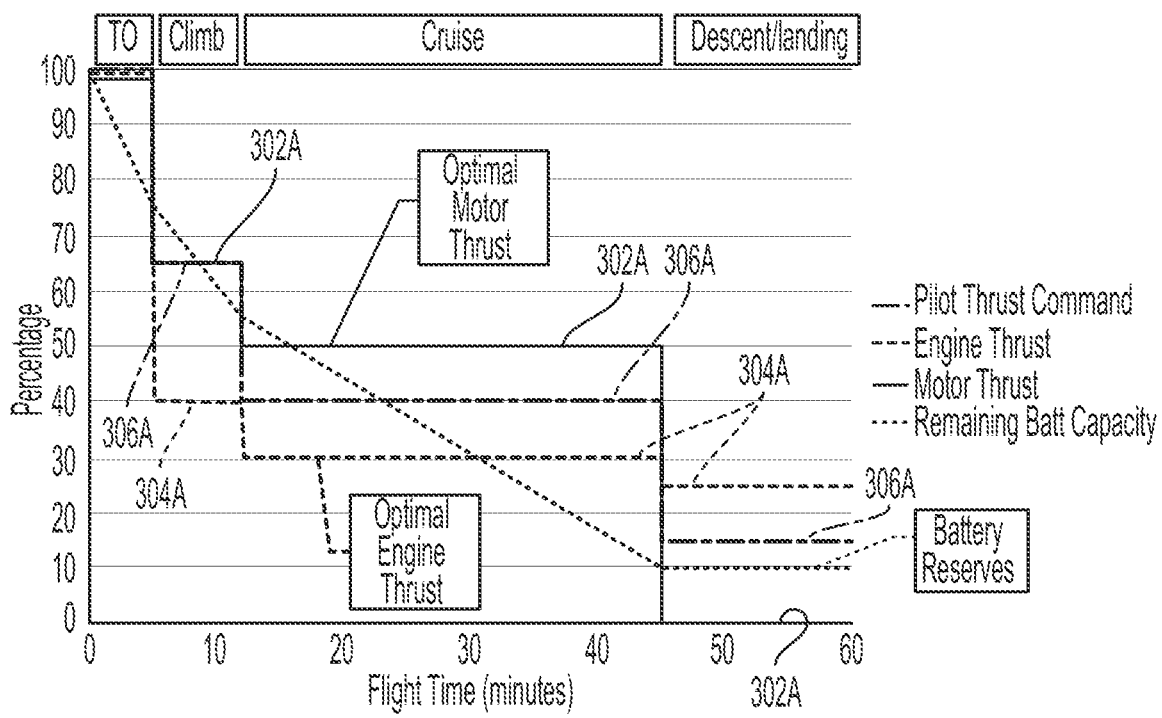
FIGS. 3A and 3B illustrate example flight profiles, in accordance with one or more implementations.
Figure 3B:
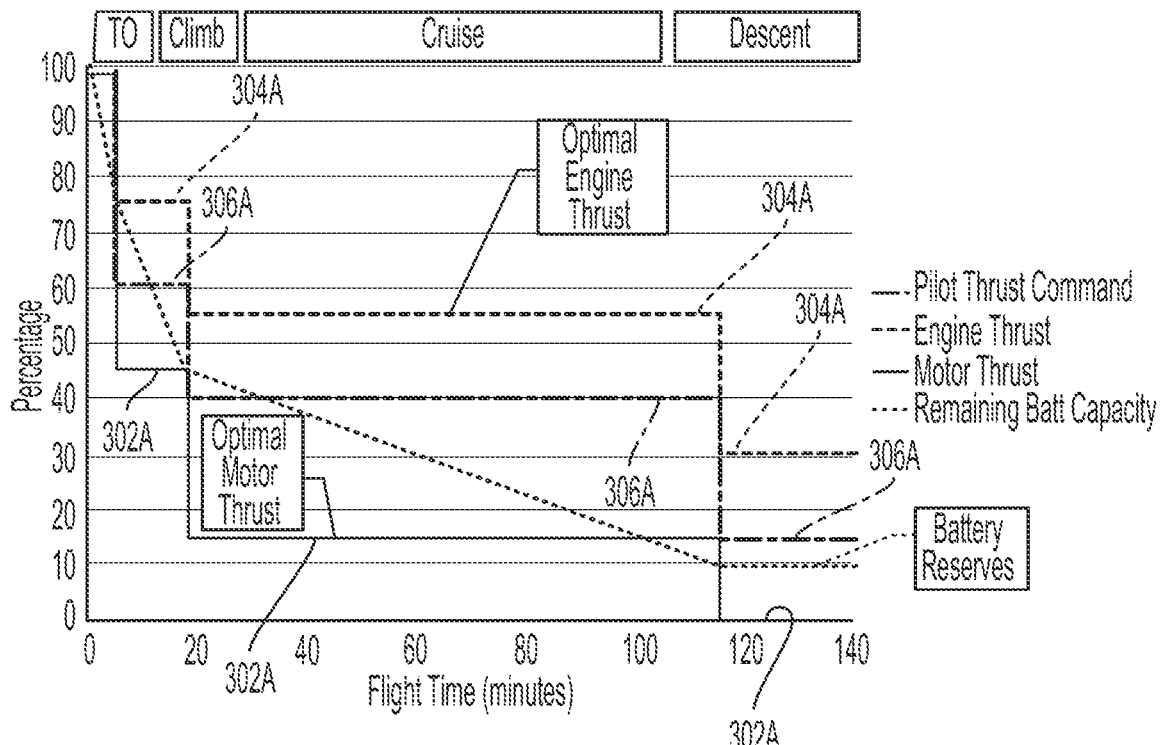

FIGS. 3A and 3B illustrate example flight profiles, in accordance with one or more implementations. FIG. 3A illustrates an example flight profile for a short distance and/or low altitude flight. Both optimal motor thrust 302A and optimal engine thrust 304A may be maxed out at the beginning of a flight during takeoff and/or the initial climb. During climbing and/or cruise, optimal motor thrust 302A may be higher than the optimal engine thrust 304A. During and/or just before landing, when the battery reserves 305A are depleted (except for some amount required for reserves), motor thrust 302A may decrease and engine thrust 304A may increase such that it is higher than motor thrust 302A. The performance thrust ratio may determine and/or indicate the optimal ratio between motor and/or engine thrust throughout a given flight. The performance thrust ratio may be based partially on pilot thrust command 306A. The performance thrust ratio may determine an effective motor and/or engine thrust distribution corresponding to the pilot thrust command. The thrust may be distributed between one or more pairs of an electric motor-driven propeller and a combustion engine-driven propulsor.

FIG. 3B illustrates an example flight profile for a long distance and/or high altitude flight. Both optimal motor thrust 302B and optimal engine thrust 304B may be maxed out at the beginning of a flight during takeoff and/or the initial climb. During climbing and/or cruise, optimal engine thrust 304B may be higher than the optimal motor thrust 302B. During and/or just before landing, when the battery reserves 305B are depleted (save for the amount required for reserves) motor thrust 302B and engine thrust 304B may decrease. The performance thrust ratio may represent and/or indicate the optimal ratio between motor and/or engine thrust throughout a given flight. The performance thrust ratio may be based partially on pilot thrust command 306B. The performance thrust ratio may determine an effective motor and/or engine thrust distribution corresponding to the pilot thrust command. The thrust may be distributed between one or more pairs of an electric motor-driven propeller and a combustion engine-driven propulsor.

By way of non-limiting example, a long flight may have a low performance thrust ratio (e.g., a low ratio of electric motor thrust to engine thrust). A short flight may have a high performance thrust ratio (e.g., a high ratio of electric motor thrust to engine thrust).

Figure 4:
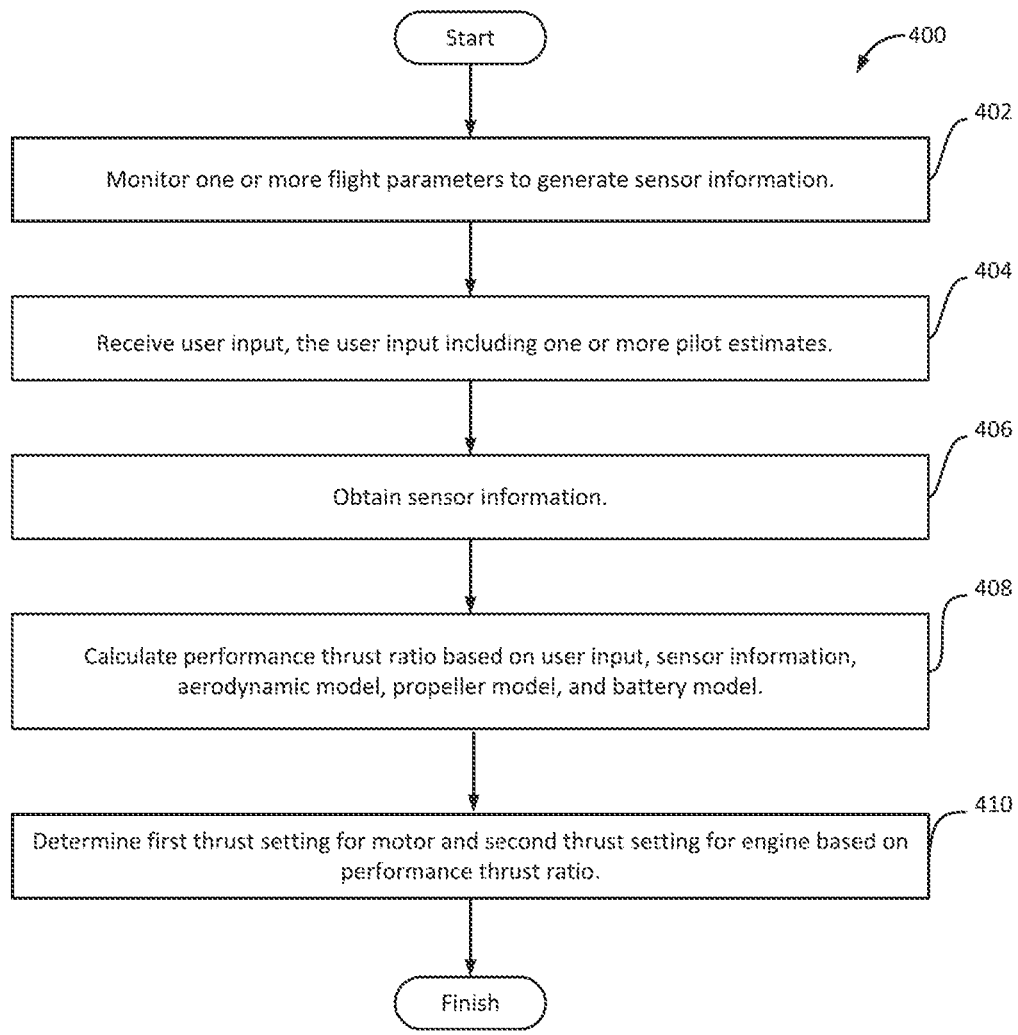
FIG. 4 illustrates a method for determining and/or controlling motor thrust and engine thrust in a parallel hybrid aircraft, in accordance with one or more implementations.

FIG. 4 illustrates a method for determining and/or controlling motor thrust and engine thrust in a parallel hybrid aircraft, in accordance with one or more implementations. The operations of method 400 presented below are intended to be illustrative. In some embodiments, method 400 may be accomplished with one or more additional operations not described, and/or without one or more of the operations discussed. Additionally, the order in which the operations of method 400 illustrated in FIG. 4 and described below is not intended to be limiting.

In some embodiments, method 400 may be implemented by one or more components of a system for determining and/or controlling motor thrust and engine thrust in a parallel hybrid aircraft. The one or more components of the system may include sensor information component 108, user input component 110, performance thrust ratio component 112, thrust setting component 114, actuator component 116, and/or other components.

At an operation 402, the system may be configured to monitor one or more flight parameters. The one or more flight parameters may be monitored by one or more sensors to generate sensor information. In some implementations, operation 402 may be performed by one or more sensors the same as or similar to sensors 126 (shown in FIGS. 1A and 1B and described herein).

At an operation 404, user input may be received. The user input may include one or more pilot estimates. In some implementations, operation 404 may be performed by a user input component the same as or similar to user input component 110 (shown in FIGS. 1A and 1B and described herein).

At an operation 406, the sensor information may be obtained. In some implementations, operation 406 may be performed by a user input component the same as or similar to user input component 110 (shown in FIGS. 1A and 1B and described herein).

At an operation 408, a performance thrust ratio may be determined. The performance thrust ratio may be determined based on the user input, the sensor information, an aerodynamic model, a propeller model, and/or a battery model. The performance thrust ratio may be used to control the motor thrust and/or engine thrust to improve utilization of electric energy throughout a flight. In some implementations, operation 408 may be performed by a user input component the same as or similar to user input component 112 (shown in FIGS. 1A and 1B and described herein).

At an operation 410, a first thrust setting may be determined for the motor. A second thrust setting for the engine may be determined based on the performance thrust ratio. In some implementations, operation 410 may be performed by a thrust setting component the same as or similar to thrust setting component 114 (shown in FIGS. 1A and 1B and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for determining and/or controlling motor thrust and engine thrust in a parallel hybrid aircraft, the system comprising:
   a motor powering one or more electric motor-driven propellers;
   an engine powering one or more internal combustion engine propulsors;
   one or more sensors configured to monitor one or more flight parameters to generate sensor information;
   one or more hardware processors configured by machine-readable instructions to:
      receive user input, the user input including one or more pilot estimates;
      obtain the sensor information;
      calculate a performance thrust ratio based on the user input, the sensor information, an aerodynamic model, a propeller model, and a battery model, wherein the performance thrust ratio is used to control the motor thrust and engine thrust to improve utilization of electric energy throughout a flight.

2. The system of claim 1, wherein the one or more sensors are configured to monitor the one or more flight parameters on a continuous or semi-continuous basis during a flight.

3. The system of claim 1, wherein the flight parameters include one or more of a battery state-of-charge, an actual altitude, and actual speed, and/or a throttle command.

4. The system of claim 1, wherein the pilot estimates include one or more of an intended flight distance, an intended cruise speed, an intended cruise altitude, an aircraft weight, and/or flight conditions.

5. The system of claim 1, wherein the aerodynamic model comprises test data and/or equations modeling flight drag.

6. The system of claim 1, wherein the propeller model comprises test data and/or equations indicating the propeller efficiency for individual ones of one or more propellers on the parallel hybrid aircraft.

7. The system of claim 1, wherein the battery model comprises test data and/or equations modeling the energy capacity of a battery, wherein the energy capacity of the battery is a function of its chemistry, size, configuration, demand over a discharge cycle, and/or history of usage.

8. The system of claim 1, wherein the parallel hybrid aircraft comprises multiple internal combustion engine-driven propulsors and/or multiple electric motor-driven propellers that are independently operable and controlled by multiple performance thrust ratios calculated based on the user input, the sensor information, the aerodynamic model, the propeller model for a corresponding propeller, and the battery model.

9. The system of claim 1, wherein the one or more hardware processors are further configured by machine-readable instructions to:
   determine a first thrust setting for the motor and a second thrust setting for the engine based on the performance thrust ratio;
   actuate the motor according to the first thrust setting; and
   actuate the engine according to the second thrust setting.

10. The system of claim 9, wherein the motor and/or engine are actuated via one or more linear actuators and/or electronic interfaces.

11. A method for determining and/or controlling motor thrust and engine thrust in a parallel hybrid aircraft, the method comprising:
   a motor powering one or more electric motor-driven propellers;
   an engine powering one or more internal combustion engine propulsors;
   monitoring one or more flight parameters to generate sensor information;
   receiving user input, the user input including one or more pilot estimates;
   obtaining the sensor information;
   calculating a performance thrust ratio based on the user input, the sensor information, an aerodynamic model, a propeller model, and a battery model, wherein the performance thrust ratio is used to control the motor thrust and engine thrust to improve utilization of electric energy throughout a flight.

12. The method of claim 11, wherein the one or more sensors are configured to monitor the one or more flight parameters on a continuous or semi-continuous basis during a flight.

13. The method of claim 11, wherein the flight parameters include one or more of a battery state-of-charge, an actual altitude, and actual speed, and/or a throttle command.

14. The method of claim 11, wherein the pilot estimates include one or more of an intended flight distance, an intended cruise speed, an intended cruise altitude, an aircraft weight, and/or flight conditions.

15. The method of claim 11, wherein the aerodynamic model comprises test data and/or equations modeling flight drag.

16. The method of claim 11, wherein the propeller model comprises test data and/or equations indicating the propeller efficiency for individual ones of one or more propellers on the parallel hybrid aircraft.

17. The method of claim 11, wherein the battery model comprises test data and/or equations modeling the energy capacity of a battery, wherein the energy capacity of the battery is a function of its chemistry, size, configuration, demand over a discharge cycle, and/or history of usage.

18. The method of claim 11, wherein the parallel hybrid aircraft comprises multiple internal combustion engine-driven propulsors and/or multiple electric motor-driven propellers that are independently operable and controlled by multiple performance thrust ratios calculated based on the user input, the sensor information, the aerodynamic model, the propeller model for a corresponding propeller, and the battery model.

19. The method of claim 11, further comprising:
determining a first thrust setting for the motor and a second thrust setting for the engine based on the performance thrust ratio;
actuating the motor according to the first thrust setting; and
actuating the engine according to the second thrust setting.

20. The method of claim 19, wherein the motor and/or engine are actuated via one or more linear actuators and/or electronic interfaces.

* * * * *